(12) United States Patent
Templeton et al.

(10) Patent No.: US 6,239,976 B1
(45) Date of Patent: May 29, 2001

(54) REINFORCED MICROMODULE

(75) Inventors: Thomas B. Templeton, Fremont; Charles F. Horejs, Jr., Morgan Hill; Thomas H. Templeton, Jr., Fremont, all of CA (US)

(73) Assignee: Comsense Technologies, Ltd., Tel-Aviv (IL)

( * ) Notice: Subject to any disclaimer, the term of this patent is extended or adjusted under 35 U.S.C. 154(b) by 0 days.

(21) Appl. No.: 09/198,866

(22) Filed: Nov. 24, 1998

(51) Int. Cl.[7] .............................. H05K 1/18; G06K 19/06
(52) U.S. Cl. .......................... 361/737; 361/761; 361/807; 257/679; 235/492
(58) Field of Search .................................. 361/736, 737, 361/761, 807, 809; 257/679, 723, 724; 235/492

(56) References Cited

U.S. PATENT DOCUMENTS

| | | |
|---|---|---|
| 4,990,759 | 2/1991 | Gloton et al. . |
| 5,420,759 * | 5/1995 | Charlier et al. ........................ 361/814 |
| 5,508,885 | 4/1996 | Ishimoto . |
| 5,521,433 | 5/1996 | Hirata et al. . |
| 5,557,503 | 9/1996 | Isaacs et al. . |
| 5,581,445 | 12/1996 | Horejs, Jr. et al. . |
| 5,615,476 | 4/1997 | Bottge et al. . |
| 5,690,773 | 11/1997 | Fidalgo et al. . |

\* cited by examiner

Primary Examiner—Jayprakash N. Gandhi
(74) Attorney, Agent, or Firm—Fenster & Company Patent Attorneys, Ltd.

(57) ABSTRACT

A reinforcement structure to protect an integrated circuit module located within a card-type data carrier or smart card. The reinforcement structure is rigid, having a modulus of elasticity higher than modulus of elasticity of the smart card, and has a thickness dimension that is co-extensive with the thickness dimension of the smart card. The reinforcement structure is provided with a cavity for housing the integrated circuit module. In a preferred embodiment, the reinforcement structure is constructed of thermally and electrically conductive material that is castable or formable to facilitate integration of additional electronic circuit elements therein. In another embodiment, the reinforcement structure is configured in the shape of a SIMM card and is used in place of the normally flexible plastic SIMM card body.

45 Claims, 4 Drawing Sheets

REINFORCED MICROMODULE

TECHNICAL FIELD

The present invention relates to a reinforced micromodule of the kind for supporting an integrated circuit and adapted for use in combination with flexible, card-type, portable data carrier devices. The present invention is also directed to fabrication methods for producing such reinforced micromodules.

BACKGROUND OF THE INVENTION

Flexible, card-type, portable data carrier devices of the type that include an integrated circuit (IC) are known in the art as "smart cards." More generally, herein, "smart card" refers to any portable card-like device which includes one or more electronic components, i.e., active components such as integrated circuits, transistors, and diodes, and passive components such as resistors, capacitors and inductors. As is practiced in the prior art, an integrated circuit (IC) package is mounted on a substrate thereby constituting a module that is, in turn, attached to the main body of the smart card. Smart cards are currently used for a wide variety of applications including prepaid "debit" cards (e.g., phone cards, transit passes, electronic purse), subscriber cards (e.g., bank ATM cards, credit cards, point-of-sale cards), loyalty scheme cards (e.g., frequent flier cards), security access and identification cards, health insurance and service cards (with optional protected memory), GSM (global system management for European cellular phones) cards and encryption/decryption cards.

Some smart cards include electrical contacts which are used to make an electrical connection between electrical circuitry on or within the smart card and an external interface of a reader/writer device. Such smart cards are referred to as "contact-type" smart cards. Other smart cards referred to as "contact-free" or "contact-less" smart cards do not include electrical contacts. Such contact-free smart cards transfer information to and from the smart card through other means such as, for example, an inductive coil formed in or on the smart card for electromagnetically coupling the smart card with an appropriate external interface. Other types of contact-free cards use electrostatic or capacitive couplings for the transfer of data and instructions to and from the card.

The smart card industry is a market that is dominated by silicon and software, but is defined by packaging options. Most smart card companies come from software or card printing environments and are attempting to implement solutions in a card format.

In accordance with the known technique, there are typically two parallel flows in the smart card production process, namely the (1) card manufacturing flow and (2) the module manufacturing flow. In the card manufacturing flow, the card body is prepared as a subassembly. Popular techniques for producing the card bodies include: (1) a laminated process in which printed layers of polyvinyl chloride (PVC) are laminated together; and (2) an injection molding process using a composition of plastics which may include acrylonitrile butadiene styrene (ABS) resin, polyester, polyvinyl chloride (PVC), polycarbonate, or polyethelynetelephthalate (PET) or a combination thereof The module manufacturing flow includes the steps of attaching the IC package or chip to a substrate, wire bonding, encapsulation, etc. The two parallel process flows are carried out separately and then converge at the point where the module subassembly is embedded within or attached to the card body subassembly. The packaging environments for commercially available smarts cards are very rudimentary and at most consist of un-reinforced plastic.

Smart cards must be flexible and at the same time sufficiently mechanically robust in order to withstand the stresses (bending and torsion) that are encountered during normal use. According to the International Standards Organization (ISO), the maximum allowable thickness of a smart card is 0.033 inches (0.84 mm). Consider, for example, the case of the standard smart card construct having a maximum allowable thickness of 0.033 inches (0.84 mm) and an embedded micro-module having a thickness on the order of 0.024 inch (0.61 mm). The remaining 0.009 inch (0.23 mm) of card material beneath the module presents a weak point on the card. The thickness of card material beneath the module and the position of the module in the card are major design parameters when the resistance of the card to mechanical bending or twisting forces is considered. A widely practiced technique to minimizing the strains transmitted to the module is to position the module in one of the corners of the card. However, this approach limits the size, number and location of modules and/or other electronic components that can be placed in the card.

The reinforcement of a micromodule by means of a metallic "Dam Wall" is practiced. It is also known from the prior art to incorporate reinforcement structure to the card body during the card manufacturing flow to provide added mechanical robustness to the smart card. For example, there is disclosed in U.S. Pat. No. 5,673,179 several techniques for incorporating reinforcement structure within one or more layers of the flexible smart card body in order to protect an integrated circuit module carried by the smart card. The reinforcement structure, having a modulus of elasticity higher than that of the plastic material card body, relieves stress on the integrated circuit module during bending and torsion of the card. The reinforcement structure comprises a separate layer of rigid material that is inserted in the card body during manufacture of the card and is preferably positioned so that it lies beneath or adjacent to the module when introduced to the card. In the conventional card manufacture, the presence of the added reinforcement layer beneath the module further limits the size (i.e., thickness) of module that can be safely and reliably carried by the card.

Whereby the prior art smart card constructions are adequate for small semiconductor devices or single chip modules, the nature of the card materials provide inadequate mechanical and environmental protection for advanced (i.e., larger) chips and multi-chip modules. Accordingly, a mechanically robust smart card capable of carrying larger and more sophisticated semiconductor chips would constitute a significant advance in the art.

However, merely increasing the size of the integrated circuits in the smart cards introduces yet another problem as the bigger chips generate more heat than can be tolerated by conventional plastic card bodies. Plastics become mechanically unstable at temperatures in excess of 50° C. Another important consideration is heat dissipation. The performance and capacity of the IC depends in large part on the ability of the packaging environment to radiate heat away from the IC. Again this must be accomplished in a manner that does not materially effect the mechanical stability of the plastic card body.

Accordingly, a module packaging arrangement for a conventional plastic smart card that enables the card to support larger, more sophisticated chips operating above 50° C. and at the same time provide for efficient heat dissipation would be extremely desirable.

SUMMARY OF THE INVENTION

It is therefore a principle object of the present invention to provide a reinforced micromodule adapted for use in creating a mechanically robust smart card of the type having a plastic card body of conventional card body manufacture.

It is another object of the invention to provide a reinforced micromodule of the type described having improved heat radiation and mechanical strength.

Briefly, in accordance with a preferred embodiment, the reinforced micromodule of the present invention comprises reinforcement structure having a thickness dimension that is coextensive with the maximum thickness dimension of the plastic card body into which it is placed. The reinforcement structure is secured to the walls of a through-hole provided in the card body by a suitable bond adhesive. The reinforcement structure includes a cavity for receiving an electronic component mounted therein, such as an integrated circuit chip or module. The cavity depth and thickness dimensions of the reinforcement material located at the bottom wall of the cavity (i.e., the region of the reinforcement structure that lies beneath and supports the electronic component) are optimized to: (1) minimize the transmission of bending and twisting forces to the electronic component; and (2) maximize the size (i.e., thickness in the Z direction) of the electronic component that can be contained within the cavity of the reinforcement structure.

The invention enables reliable and cost effective installation of significantly larger and more sophisticated chips and circuitry into smart cards of conventional plastic card body construction. The present invention conservatively allows the construction of mechanically robust smart cards incorporating a 1 and 2 Mbyte chip. This is a quantum increase in the memory capacity and communication speed of conventional smart cards.

In accordance with an advantageous feature of the invention, the reinforcement structure is formed as either a cast or machined piece thereby facilitating the integration of additional circuit elements such as RF antennas, capacitance coupling plates, additional chips, batteries, discrete components, etc.

The material selection of the reinforcement structure can provide for superior thermal conductivity resulting in lower operating temperatures, increased circuit speed and device reliability. In addition, the material selection of the reinforcement structure can provide for a shielding environment resulting in lower system noise.

In accordance with another advantageous aspect of the invention, the reinforcement structure forms an enclosure for all but one of the surfaces of the electronic component thereby providing an efficient heat sink for the electronic component and also providing for significantly enhanced electrostatic discharge protection.

In accordance with a method aspect of the invention, the reinforcement structure and electronic component are first integrated as a subassembly in module format before being inserted within a plastic card body of conventional manufacture. The integration of the electric component and reinforcement structure as a module subassembly separate from the manufacture of the plastic card body allows for arduous, accelerated mechanical and electrical stress testing of the module subassembly prior to insertion within the card body. The type of testing that can be done may include exposure to temperatures and stresses at values beyond which can be safely tolerated by the plastic materials of the conventional card bodies. In this way, infant mortality rates and optimized processes of integration and materials of construction can be determined prior to final assembly.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

The accompanying drawings incorporated in and forming a part of the specification, illustrate several aspects of the present invention, and together with the description serve to explain the principles of the invention.

DETAILED DESCRIPTION OF THE PREFERRED EMBODIMENTS

Figure 1:
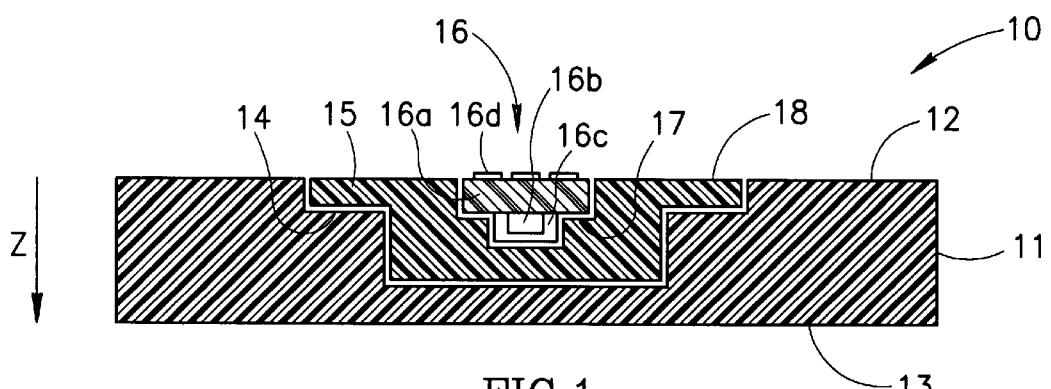
FIG. 1 is a cross section of a prior art contact type card having an integrated circuit module and an embedded plate type reinforcement structure disposed beneath the integrated circuit module.

With reference to FIG. 1, there is illustrated a cross section (not drawn to scale) through a smart card assembly 10 in accordance with a reinforced, contact-type smart card embodiment known from the prior art. The card assembly 10 is constructed of a single plastic layer 11 having an upper surface 12 and a lower surface 13. An opening 14 is provided in the upper surface 12 and is sized to receive reinforcement structure 15 which is affixed thereto using a suitable adhesive. An integrated circuit module 16 is similarly affixed within opening 17 provided within upper surface 18 of reinforcement structure 15. The module 16 includes a substrate 16a, an electronic component 16b, and encapsulant 16c Electrical contacts, such as contact 16d, are formed on the side of the substrate 16a opposite the electronic component 16b to provide access to an external interface for a contact type card.

While the smart card construct illustrated in FIG. 1 provides adequate reinforcement to the flexible card body to protect the integrated circuit during typical bending and torsion of the smart card, the combined thicknesses of the added reinforcement structure and card material underlying the module effectively limit the size of module (i.e., thickness in the Z direction) that can be reliably carried by the card. In addition, in this design crack initiation sites tend to occur in the card material underlying the module during repeated light flexing of such reinforced smart cards. Normally, when a flexible plastic card is flexed, the card will conform to the radius of bend. In the case where a flexible card is reinforced with an embedded stiffener or reinforcement structure as shown in FIG. 1, there is little or no radius of bend over the more rigid reinforced regions of the card. This means that exaggerated bending will occur at the transition regions between the more flexible card body and the less flexible reinforcement structure, thus causing crease formations to form in the card material that ultimately lead to premature card failure.

Figure 2:
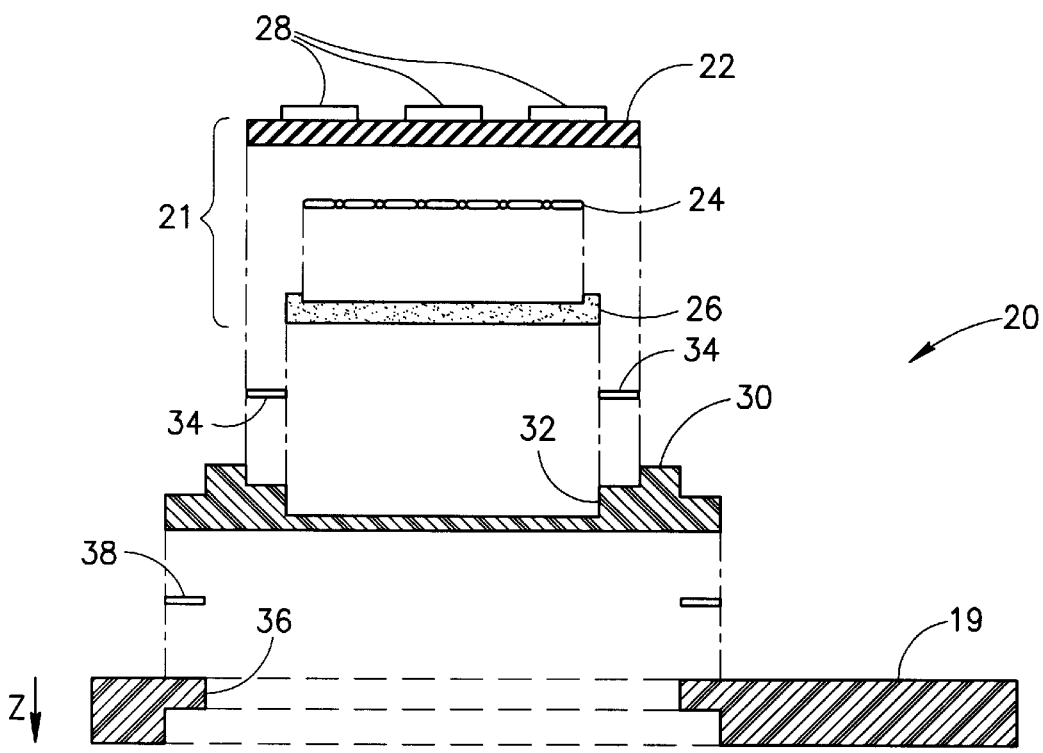
FIG. 2 is an exploded cross sectional view of a card body fitted with a reinforced micromodule of the present invention.
Figure 3:
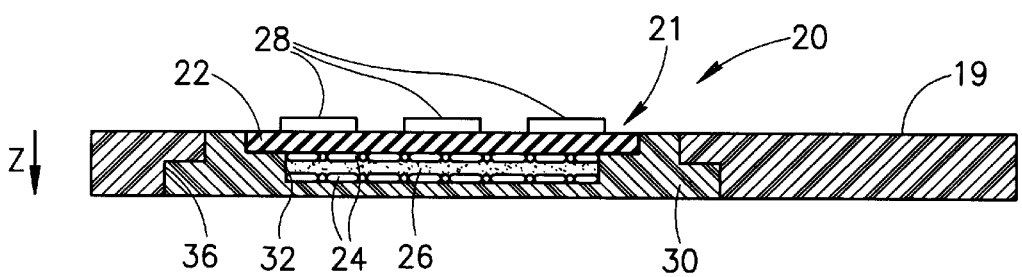
FIG. 3 is a cross sectional view of the fully assembled card body and reinforced micromodule of FIG. 2.

FIGS. 2–3 show a cross section through a contact-type reinforced card-type data carrier in accordance with a first embodiment of the invention. The data carrier includes a semi rigid plastic card body 19 of conventional manufacture together with a reinforced micromodule assembly 20 constructed in accordance with one embodiment of the present invention. As will be described in greater detail below, the reinforced micromodule 20 of the present invention may be used in combination with a plastic card body 19 to create an improved reinforced card-type data carrier or smart card or may be used separately as an improved SIMM card for use in mobile communications devices, cellular phones, and the like.

The reinforced micromodule assembly 20 includes a micromodule 21 comprised of substrate 22, an electronic component 24, and an encapsulant 26. Electrical contacts 28 (shown in enlarged detail) may be formed on one surface of the substrate 22 opposite the electronic component 24 to provide access to an external interface for a contact-type card.

The reinforced micromodule assembly 20 further includes a reinforcing member or reinforcement structure 30 with a cavity 32 for containing the above-described micromodule 21. In accordance with a preferred embodiment, the side walls of the cavity 32 are stepped or otherwise configured to accommodate the different width and thickness dimensions of the substrate 22 and electronic component 24 so that the exposed contact surface of the micromodule 21 is flush with the adjacent surfaces of the card body 19. The micromodule 21 is preferably secured to the cavity 32 by means of an adhesive 34. Suitable adhesives for this purpose include two-part epoxies and other types of adhesive systems capable of withstanding repeated exposure to high temperatures in the range of 150 up to 200° C. or higher for significant periods of time. An advantage of using a high temperature adhesive is that it permits accelerated age testing and infant mortality screening of the reinforced micromodule assembly 20 prior to final assembly with the card body 19. It is preferred to perform the accelerated age and stress testing of the packaged micromodule (i.e., packaged within the reinforcing member 30) prior to being combined with the plastic card body since the plastic card bodies of conventional manufacture tend to become unstable when subjected to temperatures much above 50° C.

In accordance with the conventional practice, the card body 19 is made of plastic material, for example polyvinyl chloride (PVC) or another thermoplastic or thermosetting material. It may be made by the superposition of thin sheets, bonded to one another to form a laminate. Alternatively, the card body 19 may be produced by injection molding. The card body 19 is provided with a through-hole 32 that extends through the thickness or Z direction of the card body 19. To complete the reinforced card-type data carrier the reinforcing member 30 is secured to walls of the through-hole 32 of the card body 19 by means of a suitable adhesive 38. In addition to high bond strength, the adhesive 38 should exhibit sufficient elasticity to absorb the flex and force moments that are subjected to the card assembly during typical usage. In this way, the flex and force moments are absorbed by the adhesive and not by the circuit element carrying portion of the micromodule 21. Presently preferred adhesives for this purpose include the class of silicone rubbers known as RTV (room temperature vulcanizing) type rubbers.

In use, the micromodule 21 is made in accordance with conventional IC chip manufacturing techniques. In all embodiments of the invention, the material used for the reinforcing member preferably has a higher modulus of elasticity than the material for the card body. Depending on the desired application, the reinforcing member 30 may be formed from a variety of materials ranging from composite materials such as molding compounds, molding epoxy, polyenylene sulfide molding compound, or polymerizable polyurethane compounds, metal fiber resin material to all metal materials such as steel or iron. Alternate metal materials for use in forming the reinforcing member 30 may include copper alloys, aluminum alloys, brass, nickle, etc. Various known metal forming techniques, such as cold working, machining, casting, electro-forming, spray-deposition (for aluminum alloys), and sintering, may be used to fabricate the reinforcing member 30 depending on the metal composition that is desired.

In the case where the reinforcing member 30 is formed from metal fiber resin material, metal fibers are mixed in a resin, for example, a thermoplastic resin. The metal fibers for use in forming the metal fiber resin material should have a relatively high thermal conductivity. Metal fibers such as copper, aluminum or gold, or a combination thereof, may be used.

In the case where the reinforcing member 30 is formed from metal material or metal fiber resin material, numerous advantages can be realized. In addition to providing a reinforcement structure of superior strength, the metal material or metal fiber resin material in combination with the thickness and configuration of the reinforcing member 30 advantageously provides a very efficient heat sink for the IC chip contained within the micromodule 21.

In a standard power package, the electronic component (IC) is mounted directly to a heat sink and is connected internally though layers of ceramic traces. The heat sink is usually in the form of a large copper or aluminum sheet. The large size and exposed metal surfaces of the heat sink help to keep the IC cool. The IC will operate improperly or suffer damaged if it becomes too hot. The thermal resistance from junction to ambient, $\Theta_{ja}$, is a function of the IC itself in terms of its X, Y, and Z dimensions. The thermal resistance of the case is the paramount measurement factor in keeping the IC cool. In the case of the standard power package where the chip is attached directly to a large copper or aluminum heat sink, it is possible to achieve a $\Theta_{ja}$ that is below 1° C. per Watt. Therefore, in the case of an electronic device that generates 20 or 30 Watts, or even some higher end microprocessor that is capable of generating up to 35 to 40 Watts, it is important to have a case construction that permits no more than 1° C. per Watt to be added to the junction temperature so that if the inside on the case is running at 70° C., the chip junction temperature is staying below a maximum of 100 or 110° C. for reliability.

In the conventional power package, the more complex and sophisticated hotter running chips are often kept cool through the use of additional heat extraction means such as upstanding heat sink fins, cooling fans, liquid cooling, etc. Smart card chips today are not at this stage yet and they are by necessity generally low power chips due to the limitations in the size of chip and limitations in the thermal handling capabilities of the plastic smart card packaging environments.

In the present invention, however, the entire package becomes a heat sink which enable heat radiation in multiple directions. The reinforcing member 30 extends along the edges of the IC and covers the encapsulant area of the chip. The present invention provides a significant increase in the cross sectional area of the thermal resistance and provides a parallel thermal pack so that the overall thermal resistance from the junction to the ambient, when all directions and cross sectional areas are considered, is substantially below that of conventional smart card packages.

In addition to providing improved thermal spreading for the heat generated by the IC, another advantage of the reinforcing member 30 is that, by occupying the entire Z direction of the card (the Z direction being the thickness direction of the card body 19), a very deep cavity 32 for receiving the micromodule 21 can be formed. Thus larger and more powerful IC's can be packaged within the reinforcing member 30 with adequate heat dissipation. In contrast to the smart card constructions of the prior art, no portion of the plastic card body 19 is in direct contact with the micromodule 21 and there is no plastic card body portion underlying the micromodule cavity 32 of the present invention. Thus, the present invention affords a 0.15 to 0.20 mm increase in the Z space or volume of the micromodule cavity 32 while at the same time remains within the overall maximum thickness limits. This permits more circuit elements to be placed in the micromodule without adding to the thickness of the card.

In accordance with present day industry standards, the size limit of the chip used in smart card constructions is measured in terms of its memory capacity, with 8 kilobytes being the typical maximum size available. The present invention allows for an increase in memory capacities in excess of 1 to 2 megabytes with a single chip implementation and as much as 2 to 4 times this amount for multi-chip implementations.

Figure 4:
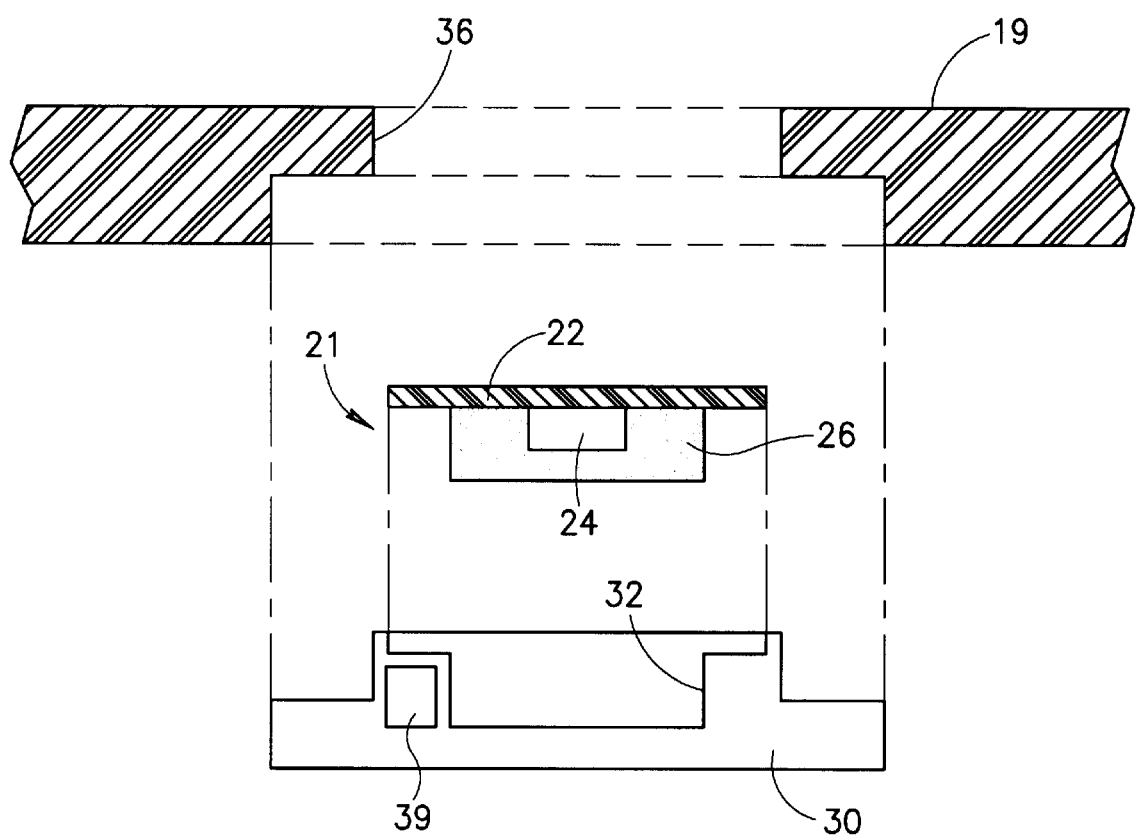
FIG. 4 is a cross sectional view of a card body fitted with a reinforced micromodule in accordance with an alternate embodiment of the invention.

With reference to FIG. 4, another advantage of extending the thickness of the reinforcing member 30 to occupy the entire Z direction of the card is that it permits additional space for the integration of additional circuit element(s) 39 separate from the micromodule 21. The reinforcing member 30 may be formed as either a cast or machined piece to facilitate the integration of the additional circuit element(s) 39. The nature of the additional circuit element(s) 39 to be integrated into the reinforcing member 30 would depend, of course, on the intended application. For example, the additional circuit element(s) 39 may include RF antennas, capacitance coupling plates, additional chips, batteries, discrete components, etc.

Figure 5:
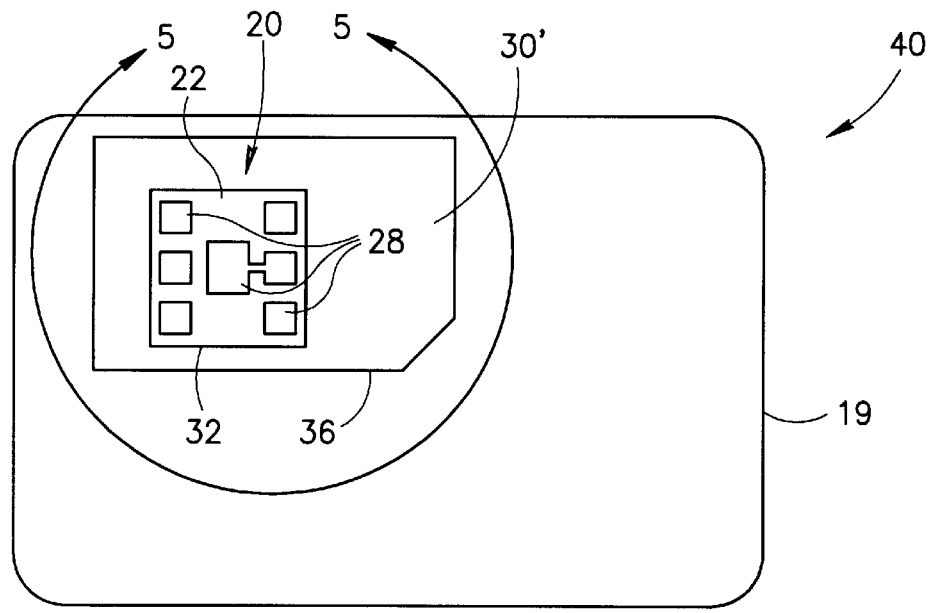
FIG. 5 is top plan view of a card-type data carrier which includes a reinforced micromodule in accordance with another embodiment of the invention.
Figure 6:
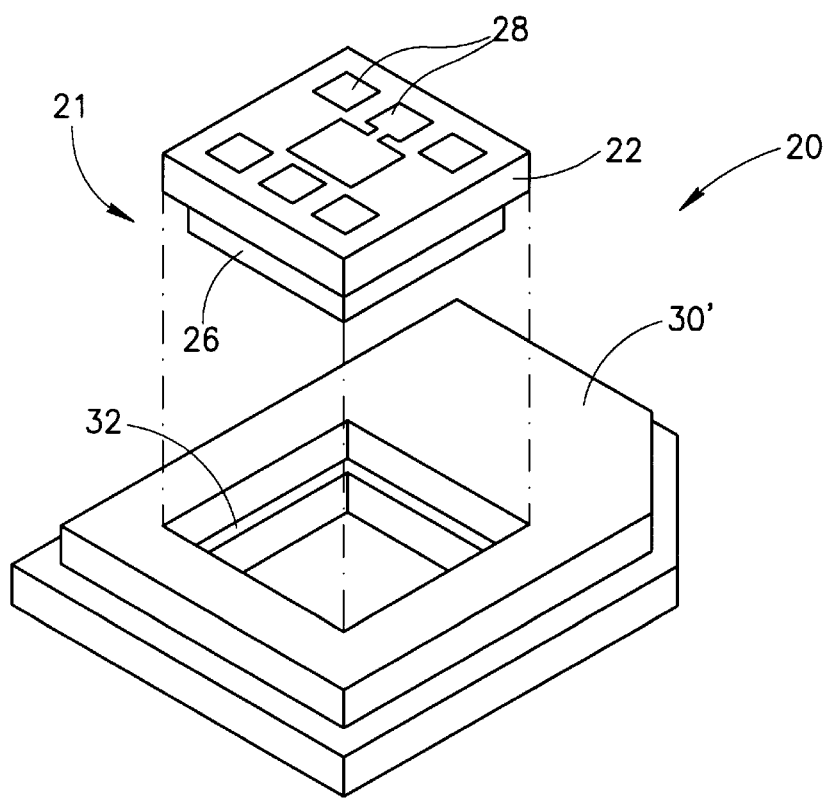
FIG. 6 is an enlarged perspective view of the reinforced micromodule encircled by arrow 5—5 in FIG. 4.

FIG. 5 is a top view which shows a fully assembled card-type data carrier or smart card 40 with a standard ISO format. The smart card 40 is composed of the card body 19 and the reinforced micromodule assembly 20 of FIGS. 2–3. In this embodiment, the reinforcing member 30' may be configured for dual use as a SIMM card of the type used in cellular telephones. FIG. 6 shows an enlarged view of the SIMM card embodiment of the reinforced micromodule 20. In this embodiment, the width and length dimensions of the reinforcing member 30' are configured in conformance with the appropriate SIMM card format.

Figure 7:
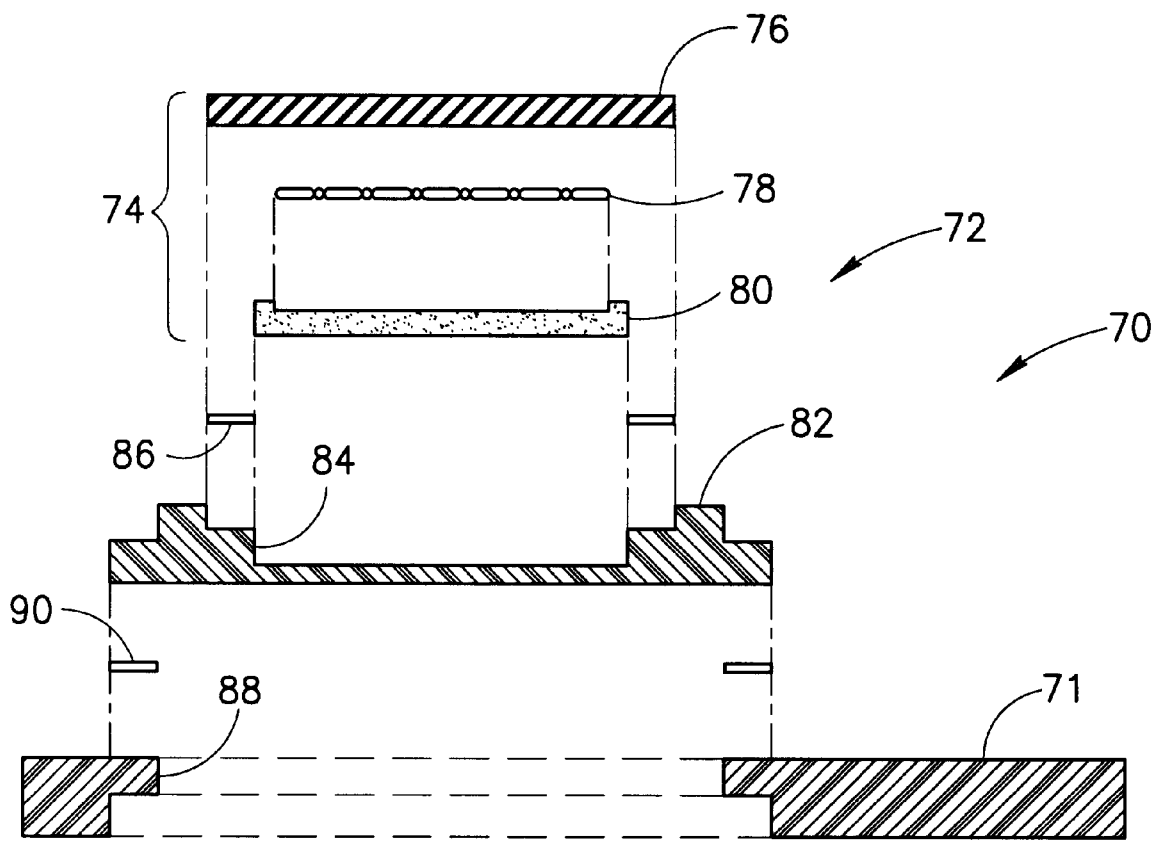
FIG. 7 is an exploded cross sectional view of a card body fitted with a reinforced micromodule in accordance with another embodiment of the present invention.
Figure 8:
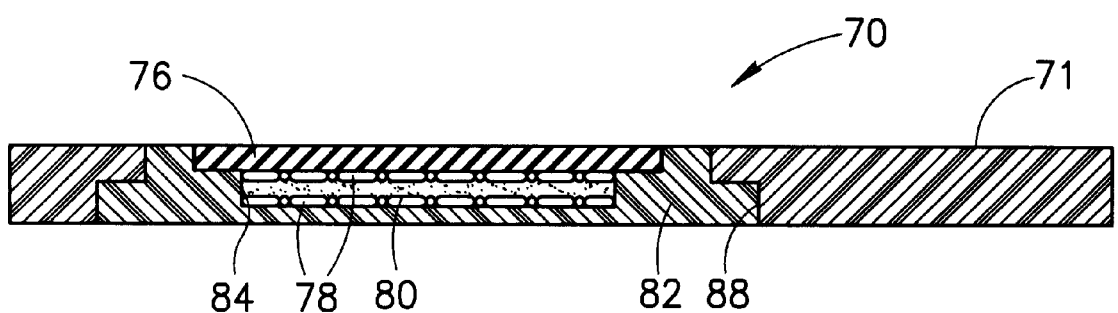
FIG. 8 is a cross sectional view of the fully assembled card body and reinforced micromodule of FIG. 8.

FIGS. 7–8 show cross sections through a contact-free reinforced card-type data carrier 70 in accordance with another embodiment of the present invention. The data carrier 70 includes a semi rigid plastic card body 71 and a reinforced micromodule assembly 72.

In this embodiment the reinforced micromodule assembly 72 includes a contact free-micromodule 74 comprised of substrate 76, an electronic component 78, and an encapsulant 80. As before, the reinforced micromodule assembly 72 further includes a reinforcing member or reinforcement structure 82 with a cavity 84 for containing the above-described contact-free micromodule 74. Additional electronic components (not shown) may be integrated into the reinforcing member 82 as desired.

As before, the micromodule 74 is bonded to the cavity 32 by means of a high temperature adhesive 86 and the reinforcing member 30 is secured to walls of the through-hole 88 of the card body 71 by means of an elastic adhesive 90.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A reinforced card-type data carrier, comprising:
 a) a semi-rigid card body having a first modulus of elasticity, a first thickness dimension and at least one through-hole provided in said thickness dimension;
 b) a reinforcement structure, secured within said at least one through-hole, wherein said reinforcement structure includes:
  i) a second modulus of elasticity, said second modulus of elasticity being different from said first modulus of elasticity;
  ii) a second thickness dimension, said second thickness dimension being substantially co-extensive with said first thickness dimension;
 and
 c) a micromodule having an electronic component, said micromodule being housed within the semi-rigid card body or the reinforcement structure.

2. The reinforced card-type data carrier according to claim 1, wherein said reinforcement structure comprises a thermally conductive material.

3. The reinforced card-type data carrier according to claim 2, wherein said reinforcement structure further comprises a metal.

4. The reinforced card-type data carrier according to claim 2, wherein said reinforcement structure further comprises metal fiber resin material.

5. The reinforced card-type data carrier according to claim 2, wherein said reinforcement structure further comprises a molding compound.

6. The reinforced card-type data carrier according to claim 1, wherein said reinforcement structure comprises a molding compound.

7. A data carrier according to claim 1, wherein the micromodule is housed within a cavity within the reinforcement structure.

8. The reinforced card-type data carrier according to claim 7, wherein at least one additional circuit element is contained within said reinforcement structure.

9. The reinforced card-type data carrier according to claim 7, wherein said micromodule has contacts which are exposed at said upper surface of said reinforcement structure.

10. The reinforced card-type data carrier according to claim 7, wherein said micromodule is secured within said cavity by an adhesive having sufficient elasticity to absorb flex and force moments subjected to the data carrier during typical usage.

11. A data carrier according to claim 1, wherein the micromodule is housed within the semi-rigid card body.

12. A data carrier according to claim 1, wherein the reinforcement structure is secured within said at least one through-hole by an adhesive.

13. A data carrier according to claim 12, wherein the adhesive comprises a room temperature vulcanizing silicon rubber compound.

14. A data carrier according to claim 1, wherein the reinforcement structure is permanently secured within said at least one through-hole.

15. A reinforced card-type data carrier, comprising:

a semi-rigid card body having at least one hole;

a rigid reinforcement structure, comprising a thermally conductive material, secured within the hole;

a micromodule having an electronic component, said micromodule being housed within said reinforcement structure; and bonding means for securing said micromodule within said reinforcement structure.

16. The reinforced data carrier according to claim 15, wherein at least one additional circuit element is contained within said reinforcement structure.

17. The reinforced data carrier according to claim 15, wherein said reinforcement structure comprises a molding compound.

18. The reinforced data carrier according to claim 17, wherein at least one additional circuit element is contained within said reinforcement structure.

19. The reinforced data carrier according to claim 15, wherein said reinforcement structure further comprises a metal.

20. The reinforced data carrier according to claim 15, wherein said reinforcement structure further comprises metal fiber resin material.

21. The reinforced data carrier according to claim 15, wherein said micromodule has contacts which are exposed at an upper surface of said reinforcement structure.

22. The reinforced data carrier according to claim 15, wherein said bonding means comprises an adhesive having sufficient elasticity to absorb flex and force moments subjected to the data carrier during typical usage.

23. The reinforced data carrier according to claim 22, wherein said adhesive comprises a room temperature vulcanizing silicone rubber compound.

24. A data carrier according to claim 15, wherein the at least one hole comprises a through hole.

25. A card-type data carrier, comprising:

a semi-rigid card body having at least one cavity;

a rigid reinforcement structure secured within the cavity;

a micromodule secured within the reinforcement structure; and at least one additional electrical element secured within the reinforcement structure.

26. A data carrier according to claim 25, wherein the semi-rigid card body has a first modulus of elasticity and the rigid reinforcement structure has a second modulus of elasticity greater than the first modulus of elasticity.

27. A data carrier according to claim 25, wherein the at least one additional electrical element is electrically connected to the micromodule.

28. A data carrier according to claim 25, wherein the reinforcement structure is secured within the cavity by an adhesive.

29. A data carrier according to claim 25, wherein the semi-rigid card body has a size substantially as defined by the international standard organization for smart cards.

30. A data carrier according to claim 25, wherein the rigid reinforcement structure comprises a thermally conductive material.

31. A data carrier according to claim 25, wherein the rigid reinforcement structure comprises a molding compound or a metal.

32. A data carrier according to claim 25, wherein the additional electrical element comprises an antenna.

33. A data carrier according to claim 25, wherein the additional electrical element comprises a capacitor.

34. A data carrier according to claim 25, wherein the additional electrical element comprises a battery.

35. A data carrier according to claim 25, wherein the additional electrical element comprises an additional micromodule.

36. A data carrier according to claim 25, wherein the micromodule has an equivalent memory capacity in excess of 1 megabyte.

37. A data carrier according to claim 25, wherein the at least one cavity comprises a through hole.

38. A method of manufacturing a smart card, comprising:

providing a reinforcement structure;

integrating a micromodule into the reinforcement structure;

providing a semi-rigid card body having a through hole; and securely fastening the integrated reinforcement structure and micromodule within the through hole.

39. A method according to claim 38, wherein securely fastening the integrated reinforcement structure and micromodule within the through hole comprises securing the integrated reinforcement structure and micromodule to the card using an adhesive.

40. A method of manufacturing a smart card, comprising:

selecting a thermally conductive reinforcement structure;

securely fastening the integrated reinforcement structure in a hole of a semi-rigid card body; and placing a micromodule within the reinforcement structure or the semi-rigid card body.

41. A method according to claim 40, wherein selecting the reinforcement structure comprises selecting a structure produced by casting.

42. A method according to claim 40, wherein selecting the reinforcement structure comprises selecting a structure produced by machining.

43. A method according to claim 40, wherein selecting the reinforcement structure comprises selecting a reinforcement structure which provides electrostatic discharge protection to the micromodule.

44. A method according to claim 40, wherein placing the micromodule within the reinforcement structure or the semi-rigid card body comprises placing in a location such that the reinforcement structure provides shielding.

45. A smart card produced using the method of claim 40.

* * * * *